(12) United States Patent
Mueller-Rentz et al.

(10) Patent No.: US 12,449,649 B2
(45) Date of Patent: Oct. 21, 2025

(54) MICROSCOPE FOR TRANSMITTED LIGHT CONTRASTING

(71) Applicant: LEICA MICROSYSTEMS CMS GMBH, Wetzlar (DE)

(72) Inventors: Arnold Mueller-Rentz, Brechen (DE); Christian Schumann, Lich (DE); Sebastian Hitzler, Hohenahr-Erda (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 741 days.

(21) Appl. No.: 17/827,823

(22) Filed: May 30, 2022

(65) Prior Publication Data

US 2022/0390732 A1 Dec. 8, 2022

(30) Foreign Application Priority Data

Jun. 1, 2021 (EP) .................................... 21177041

(51) Int. Cl.
| | |
|---|---|
| *G02B 21/14* | (2006.01) |
| *G02B 21/02* | (2006.01) |
| *G02B 21/08* | (2006.01) |
| *G02B 21/24* | (2006.01) |

(52) U.S. Cl.
CPC ............ *G02B 21/14* (2013.01); *G02B 21/02* (2013.01); *G02B 21/086* (2013.01); *G02B 21/241* (2013.01)

(58) Field of Classification Search
CPC ...... G02B 21/14; G02B 21/02; G02B 21/086; G02B 21/241
See application file for complete search history.

(56) References Cited

U.S. PATENT DOCUMENTS

| | | | | |
|---|---|---|---|---|
| 4,200,353 A | * | 4/1980 | Hoffman | ................ G02B 21/14 |
| | | | | 359/370 |
| 4,756,611 A | | 7/1988 | Yonekubo et al. | |
| 2009/0040601 A1 | * | 2/2009 | Saito | .................. G02B 21/0092 |
| | | | | 359/386 |
| 2014/0118820 A1 | * | 5/2014 | Kaneki | .............. G02B 21/0092 |
| | | | | 359/386 |
| 2022/0244516 A1 | * | 8/2022 | Ikeda | ................... G02B 21/361 |

FOREIGN PATENT DOCUMENTS

| | | |
|---|---|---|
| DE | 102005023850 A1 | 11/2006 |
| EP | 2078974 A2 | 7/2009 |

OTHER PUBLICATIONS

Michael Chen, Lei Tian, and Laura Waller, "3D differential phase contrast microscopy," Biomed. Opt. Express 7, pp. 3940-3950, Sep. 9, 2016, Optical Society of America, US.

* cited by examiner

*Primary Examiner* — Nathanael R Briggs
(74) *Attorney, Agent, or Firm* — LEYDIG, VOIT & MAYER, LTD.

(57) ABSTRACT

A microscope for imaging a sample by a transmitted light contrasting method includes an objective lens holder configured to place an objective lens of a number of objective lenses onto an optical axis of the microscope. The microscope further includes a lens system for forming an intermediate image of an exit pupil of any one of the number of objective lenses placed onto the optical axis. The intermediate image is formed at a respective conjugated plane conjugate to the exit pupil. The microscope further includes a control device configured for automatically positioning a modulation element onto the optical axis at a positon related to the respective conjugated plane.

21 Claims, 7 Drawing Sheets

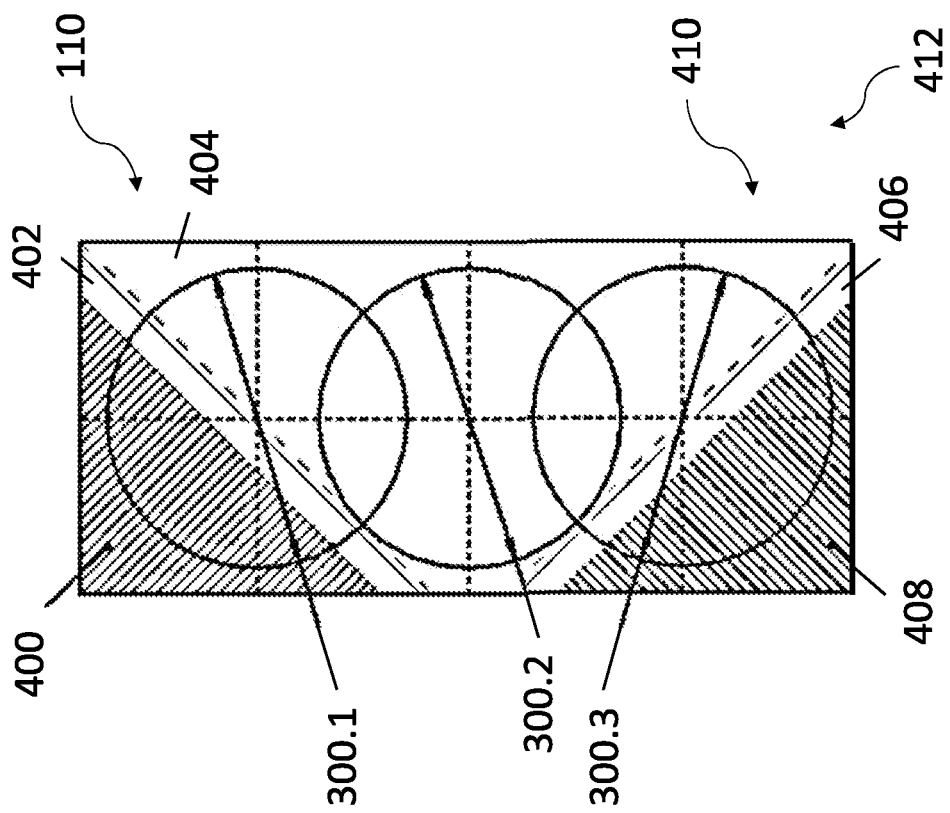
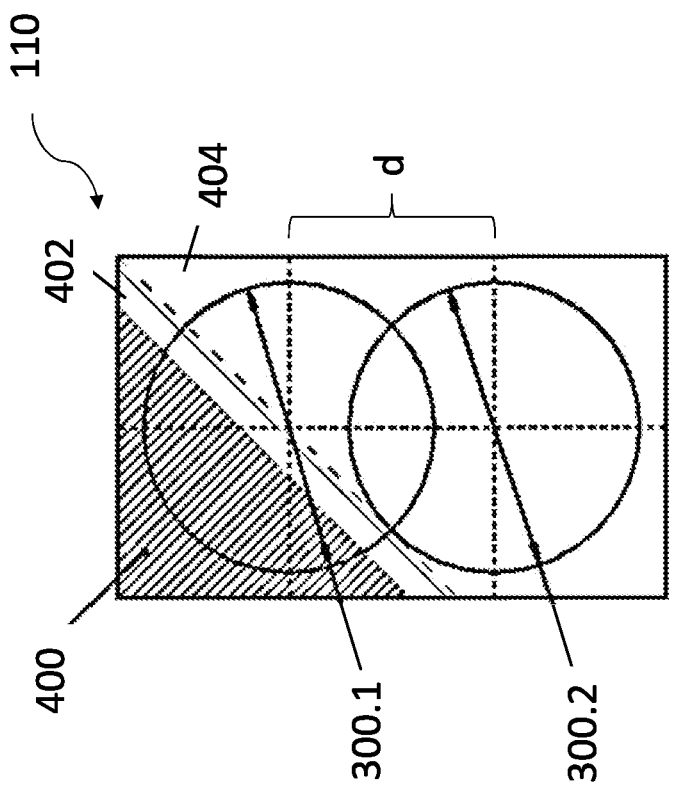

MICROSCOPE FOR TRANSMITTED LIGHT CONTRASTING

CROSS REFERENCE TO RELATED APPLICATIONS

This application claims benefit to European Patent Application No. EP 21177041.7, filed on Jun. 1, 2021, which is hereby incorporated by reference herein.

FIELD

The present invention essentially relates to a microscope for imaging a sample by a transmitted light contrasting method.

BACKGROUND

In microscopy, transmitted light contrasting methods can be used to convert phase information of an object into intensity modulations, which can be detected by a detector. This allows observation of thin unstained specimens, especially in biological imaging in cell biology. This, usually, can involve modulation elements like phase rings (ring diaphragms) or modulators. Such modulators, typically, also involve amplitude modulations, i.e. attenuation of light passing through the microscope objective lens. These modulators should be positioned in a plane conjugate to the exit pupil of the microscope objective lens to ensure a homogenous contrasting and translationally invariant imaging over the field of view.

SUMMARY

Embodiments of the present invention provides a microscope for imaging a sample by a transmitted light contrasting method. The microscope includes an objective lens holder or changer configured to place an objective lens of a number of objective lenses onto an optical axis of the microscope. The microscope further includes a lens system for forming an intermediate image of an exit pupil of any one of the number of objective lenses placed onto the optical axis. The intermediate image is formed at a respective conjugated plane conjugate to the exit pupil. The microscope further includes a control device configured for automatically positioning a modulation element onto the optical axis at a positon related to the respective conjugated plane.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 4a and 4b schematically show modulation elements of a microscope according to another embodiment of the invention;

DETAILED DESCRIPTION

Figure 1:
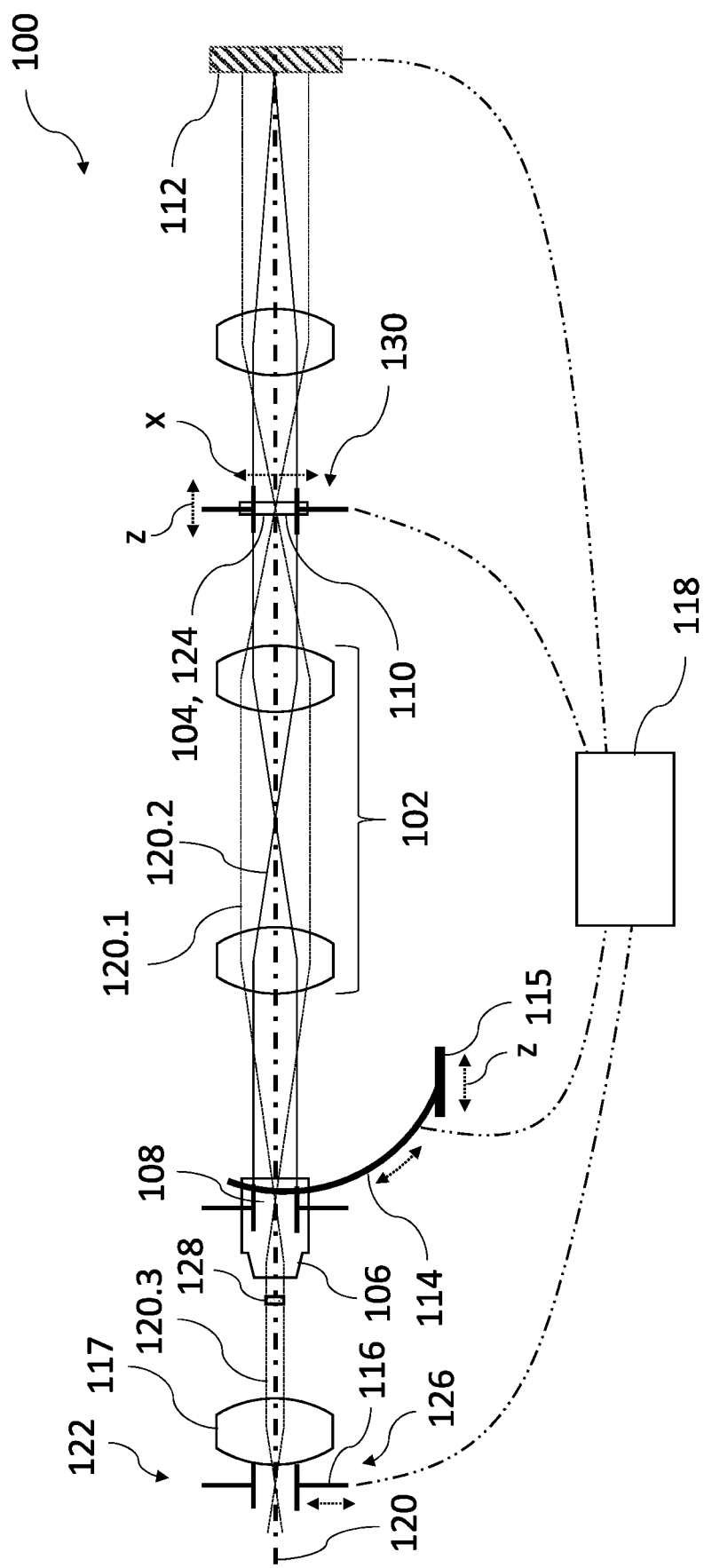
FIG. 1 schematically shows a microscope according to an embodiment of the invention.

In view of the drawbacks and problems described above, there is a need for an improved way of providing a modulator in a microscope. According to an embodiment of the invention, a microscope with the features of claim 1 is proposed. Advantageous further developments form the subject matter of the dependent claims and of the subsequent description.

An embodiment of the invention, generally, relates to a microscope that is configured for imaging a sample at least by a transmitted light contrasting method. Said microscope comprises an objective lens changer configured to place an objective lens out of a number (or plurality) of objective lenses onto an optical axis of the microscope. Note that said microscope could also be equipped with only a single objective lens. In such case, no objective lens changer would be necessary, a simple objective lens holder is sufficient. Said microscope further comprises a lens system for forming a real intermediate image of an exit pupil of any one of the objective lenses placed onto the optical axis (or of the single objective lens, if applicable), the intermediate image being formed at a respective conjugated plane conjugate to the exit pupil. Typically, said microscope also comprises an illumination unit for generating an illumination beam path for illuminating the sample to be imaged; the respective objective lens placed onto the optical axis generates an imaging beam path for imaging the sample. Preferably, said microscope further comprises a digital image detection module (detector) for detecting an image of the sample to be imaged. Such digital image detection module might be or comprise a camera (or be comprised in a camera).

The microscope can be an inverse microscope or an upright microscope. In inverse microscopes, for example, the object to be examined (i.e., the sample) is illuminated from above using the transmitted light method, and objective lenses are attached under the microscope stage. In case of inverted reflected-light microscopes, both the illumination and the observation through the objective lens are performed from below. Such incident light microscopes play a major role, for example, in mineralogy and metallurgy, while inverted transmitted light microscopes are often used for examining or manipulating biological samples. Inverted microscopes allow good accessibility to the sample to be examined, as the imaging optics are typically arranged below the microscope stage, i.e. in a stand of the microscope.

In particular, biological samples and samples of small thickness appear almost transparent when viewed in normal way via the microscope. Such samples typically only have different optical thicknesses, while the light amplitude is not weakened or is weakened homogeneously over the entire sample. Optical path differences that exist when light passes through such a sample (phase object) can be made visible to the human eye by various contrasting methods. Out of known contrasting methods, such as phase contrast, modulation contrast according to Hoffmann, relief contrast, Varell contrast or interference contrast, only the phase contrast and the modulation contrast methods, which are typical representatives of contrasting method, will be explained briefly below.

In case of phase contrast, an annular diaphragm upstream in the illumination beam path is imaged to infinity by a condenser. Illumination light bundles ("zeroth diffraction arrangement") passing through the ring diaphragm and penetrating the sample without diffraction, hit a phase ring in the back focal plane (which coincides with the exit pupil for telecentric objective lenses as commonly used in microscopy) of the objective lens. That is to say, they hit an annular layer that has been coordinated by vapour deposition, for example, in such a way that, compared to the rays that penetrate the phase plate adjacent to this layer, a phase difference of $\lambda/4$ is achieved. This allows the following function: while the diffracted light has a phase shift of 180° ($\lambda/2$) with respect to zero order in case of amplitude objects, this is only 90° ($\lambda/4$) in the case of phase objects. This additionally introduced shift by 90° in the phase ring also results in a total shift of 180°, i.e. the same phase relationships as with an amplitude object. By additionally weakening the amplitude in the phase ring, the intensity of the zeroth order is adjusted to the diffraction orders. In the intermediate image plane of the microscope, an image comparable to an amplitude image now results from the interference of the diffraction orders.

Details with a higher refractive index than the surrounding area appear darker in this image. Of course, the phase ring can be cut to the ring diaphragm in such a way that the ring diaphragm is mapped onto the phase ring. The phase ring is located in the objective pupil, which is usually inside the objective itself. For phase contrast, special objective lenses are, therefore, often used in which a phase ring is integrated (for example by vapour deposition on a lens).

A combination of dielectric and metallic layers is typically used to build up a phase contrast layer. The dielectric layers (e.g. silicon oxide) can be used to adjust the phase shift, the metallic layers (e.g. chrome) can be used to set the desired degree of transmission.

The choice of a suitable phase ring (and thus the associated ring diaphragm) does not only depend on the objective lens but also on the sample to be examined, which is characterized by the respective degree of transmission and the respective phase shift.

Furthermore, the size of the phase ring should be dimensioned depending on the desired resolution or depending on the desired contrast. Special lenses with an integrated phase ring cannot react flexibly to such different requirements. This would require provision of an abundance of special lenses, which requires great effort and high costs. In practice, common special lenses are, therefore, universally applicable standard solutions, which often cannot deliver the desired result for special cases.

For the so-called modulation contrast, a plate is arranged in a pupil plane of the observation beam path, on which plate strip-shaped areas of different transparency (typically, 0%, 20% and 100%) are provided. Such plate is typically called modulator or modulation element. Since in this case, a change in the diffraction image will not occur in symmetrical manner with respect to the optical axis of the objective lens, the phase objects made visible with such a microscope additionally show a relief effect similar to that which occurs when an object or sample is illuminated obliquely from one side. On the lighting side, there is provided at least one slit-shaped diaphragm conjugated to the modulators in the imaging beam path. This is usually imaged on the strip of the modulator on the imaging side with the mean transmission. These slit-shaped diaphragms are usually located inside a condenser disk, with a special illumination slit being provided for each magnification.

Such modulators (or modulation elements) need to be positioned in the plane conjugate to the exit pupil of the microscope objective lens to ensure a homogenous contrasting and translationally invariant imaging over the field of view. While such modulating element is typically positioned in a collimated area of the field imaging beam path (orthoscopic imaging beam path), it is (at the same time) positioned in the focus of the pupil imaging beam path (conoscopic imaging beam path). Thus, moving the objective, for example, changes the axial position of the pupil image in the area of the modulation element.

A way to achieve this is, according to an embodiment of the invention, to provide the microscope with a control device. Said control device is configured for automatically positioning a modulation element (modulator) onto the optical axis at a positon of the respective plane or at a position related to the respective conjugated plane, i.e., at a position within a certain range around the conjugated plane along the optical axis. Thus, no manual positioning is required. Rather, a user of the microscope will be provided with the correct placement of the modulator without any particular interaction. A modulation element positioning device (e.g., a holder with slider) can be provided in order to arrange and move/position the modulation element. Said control device is then connected to said modulation element positioning device in order to automatically control it.

Preferably, the control device is configured for automatically moving the modulation element in an axial direction parallel to the optical axis, i.e., along the optical axis. This allows, on the one hand, proper positioning of the modulator along the optical axis according to specific needs and, on the other hand, using a single modulation element for different objective lenses or different classes of objective lenses with different positions of the exit pupil along the optical axis, for example. There is no need to provide a slider or the like, having several modulation elements arranged at different axial positions along the optical axis.

Advantageously, the control device is connected to the objective lens holder or changer for receiving information on the respective objective lens placed onto the optical axis. This allows determining the correct required (axial) position of the modulation element based on the currently used objective lens, which has a particular exit pupil position.

It is of further advantage, if the control device is connected to a focus drive of the microscope, for receiving information on an axis (or axial) position of the respective objective lens. Said focus drive is configured to move the respective objective lens placed onto the optical axis in an axial direction parallel to the optical axis. In this way, any axial movement of the currently used objective lens can instantaneously be used to determining the required axial positon of the modulation element. Note that such focus drive can be integrated into said objective lens holder or changer; in other words, a common device providing axial movement for changing the focus and for changing objective lenses can be provided.

In order to achieve the required position of the modulation element, the control device, preferably, comprises data representing the axial position of the focus drive, the position of the exit pupil of the objective lens (that is currently placed on the optical axis) relative to a defined mechanical reference surface, e.g., the mounting thread, and additional calibration data. When moving the focus drive and, thus, the objective lens along the optical axis or when changing the objective lens, the physical position of the image of the exit pupil changes and, thus, also the plane conjugate to the exit pupil. The control device recalculates said physical position of the image of the exit pupil, and then uses the calibration data to reposition the modulation element axially in the plane conjugate to the exit pupil.

In order to avoid mechanical wear and synchronization overhead, a criterion for the repositioning of the modulation element can be implemented. In other words, the control device, according to an embodiment of the invention, is configured to axially move the modulation element only if an axial position displacement of the respective conjugated plane (in case of a change of the axial position of the conjugated plate due to an objective lens change of focus change, for example) exceeds a pre-determined threshold. In a microscope with, for example, a reference focal length of 200 mm and a field of view of 25 mm (diagonal), the numerical aperture of the pupil imaging is 0.0625. Thus, the depth of focus of the pupil image is 140 µm (for a typical wavelength of 546 nm). A mechanical movement is, thus, only necessary if the cumulative correction is above such a threshold of, in that example, 140 µm. For typical high magnification imaging, this is typically only the case when searching for the specimen or changing objectives.

Preferably, the control device is configured for automatically moving the modulation element in a lateral direction in respect of the optical axis. Further, the control device is, preferably, also configured to determine a lateral displacement of the modulation element according to a quantitative image quality analysis. Said quantitative image quality analysis, in particular, comprises at least one of a quantitative reproducibility of the image impression (for example, contrast impression, i.e. the exact amount of intensity modulation due to various phase changes; in a mathematical sense, it is the transfer function, which translates the phase and amplitude properties of the object into image information) and a quantitative reproducibility of the contrast transfer function. In other words, lateral positioning of the modulation element can also be used in conjunction with the calibration data to enable quantitative reproducibility of the image impression as well as of a contrast transfer function for quantitative analysis. This holds true not only on the same microscope, but also among different microscopes of the same type. The lateral positioning of the modulation element might be exposed to the user for subjective variation of the image impression or used in pre-determined calibrated positions.

The contrast transfer function translates amplitude and phase changes through or in the sample into intensity contrast in the image. This intensity contrast shall be quantitatively reconstructed in order to assure, on the one hand, comparability of images of different samples, and, on the other hand, to use the same contrast transfer function in a quantitative reconstruction of phase. The latter one is, in a similar way, also discussed in "Michael Chen, Lei Tian, and Laura Waller, 3D differential phase contrast microscopy, Biomed. Opt. Express 7, 3940-3950 (2016)". These transfer functions are called H in eq. (11) in that article, for example. Appropriate reformulation of eq. (11), e.g., allows determining of real and imaginary parts of the refractive index (phase change and absorption) of the sample by means of the transfer functions and the images from transmitted light bright field microscopy and modulated contrast microscopy, or from different realizations of modulation contrast microscopy.

According to a preferred embodiment, the control device is configured to exchange a first modulation element by another second modulation element by lateral movement of the first modulation element out the optical axis and by lateral movement of the second modulation element onto the optical axis. This, for example, allows the use of phase and modulation contrast elements or of different modulation elements of the same type. Depending on the situation, this might require change or adaption of an illumination of the microscope, such that it fits the second (exchanged) modulation element. For example, the illumination is to be adapted in such a way that a suitable diaphragm is used for the respective modulation element. Depending on the modulator (or modulation element), the width or length of the slit diaphragm has to match the modulator. The combination of objective lens and condenser determines the magnification of the aperture diaphragm plane in the plane in which the modulator is located. If the objective lens has a different magnification, and the image of the aperture diaphragm should remain the same size, the size of the diaphragm is to be changed. If then another (different, e.g. rotated) modulator is used, the aperture is also to be adjusted accordingly (e.g. rotated) so that it fits the new modulator.

Preferably, the modulation element comprises a transparent section arranged such that upon a pre-determined lateral displacement of the modulation element out of its position on the optical axis, the imaging beam path passes the transparent section of the modulation element. This means that there is no modulation. In particular, the control unit is configured to laterally move the modulation element by the pre-determined lateral displacement in order to inactivate the modulation element. Said pre-determined displacement typically depends on the diameter of the pupil. This allows changing imaging modalities, e.g., from contrasting method to fluorescence imaging, in which no modulation is required. The user will not have to remove such modulation element manually. Specific choice of the pre-determined lateral displacement allows minimizing the necessary travel range and optimizing switching speed. In particular, the use of transparent sections allows short travel ranges.

According to a further preferred embodiment, the modulation element is embedded in an anti-reflection coated plane-parallel plate. In other words, the substrate (of the modulation element) itself can be an anti-reflection coated plane-parallel plate. This reduces potentially disturbing reflections of light in imaging.

Another or additional way to reduce such reflection or their influence is if the modulation element (plate) is tilted, in particular, relative to the optical axis when the image of the exit pupil is in a collimated section of the beam path (which is not necessarily the case). In addition or alternatively, the control device might be configured to tilt the modulation element, e.g., by means of a specific arrangement of the holder of the modulation element. This would allow tilt only if required. The modulation element being tilted relative to the optical axis, in particular, means that the modulation element is tilted by, e.g., a value between 1° and 5° out of the plane orthogonal to the optical axis.

Preferably, the illumination unit comprises a condenser lens aperture changer for generating a respective collimated illumination beam path of a respective aperture, the control device being connected to the condenser lens aperture changer in order to illuminate the sample with a pre-determined spatial illumination spectrum. This allows illuminating the specimen with a pre-determined spatial illumination spectrum necessary for the contrasting method. Said condenser lens aperture changer, in particular, comprises a condenser lens and a condenser aperture diaphragm changer (i.e., a changer for changing the condenser lens and/or the aperture diaphragm). This means that the condenser can have a fixed lens while the aperture diaphragm can be changed (e.g., via changing the aperture diameter or other dimensions) in order to provide respective illumination (see also further remarks above with respect to adapting illumination). In general, however, also the condenser lens might be adapted or changed. More sophisticated ways or measures of aperture control, such as DMD (digital micro mirror device) systems, LED (light emitting diode) arrays or the like, can also be implemented.

According to a further preferred embodiment, the control device is connected to said digital image detection module in order to detect intensity images for displaying, documentation and/or quantitative reconstruction of specimen phase and/or amplitude modulation. In particular with respect to reconstruction of phase and/or amplitude modulation, please refer to the remarks above. Further, the control device is preferably configured to determine at least one of a phase transfer function and an amplitude transfer function of the optical system of the microscope in order to reconstruct a quantitative phase image of the sample. When used in a calibrated position and using known spatial illumination distributions and design data of the optical system, the control device can calculate the imaging characteristics of the optical system, e.g., in the form of phase transfer function and amplitude transfer function. When realizing two contrasting methods with different imaging characteristics, e.g., modulation contrast and bright field or different settings of modulation contrast, the system can use the diversity of imaging characteristics and the respective transfer functions to reconstruct a quantitative phase image of the specimen.

Such a reconstruction can be based on the forward-imaging model using the linear phase and amplitude transfer function acting upon the complex (phase and amplitude) refractive index distribution of the object (sample), yielding for the at least two different imaging configurations a respective number of intensity images. These at least two relations can be combined to a linear equation system (with number of pixels times two unknown variables and at least number of pixels times two known variables), which can be solved for the real and imaginary parts of the refractive index distribution. In the presence of noise and using a so-called Tikhonov-type regularization, this can be achieved by a proper adaption of the Wiener-filter reconstruction approach described in eq. (11) of "Michael Chen, Lei Tian, and Laura Waller, 3D differential phase contrast microscopy, Biomed. Opt. Express 7, 3940-3950 (2016)". Of course, more sophisticated reconstruction methods can be envisioned, as already alluded to in the literature cited.

To sum up, embodiments of the invention allow for optimizing the usability of said contrasting methods, especially in an automated multi-modal microscope system. This is, in particular, achieved by an automated modulation contrasting microscope or its control device (or method) that automatically positions the modulator in a plane conjugate to the exit pupil of the objective lens, also respecting mechanical movement of the objective with focusing nosepieces such as commonly used in inverted microscopes, automatically removes the modulator for the beam path for bright field or fluorescence imaging, and enables a quantitative positioning of the modulator and, thus, a quantitative prediction of image formation within the theory of partially coherent imaging.

In particular, the modulator does not have to be inserted into a microscope stand manually and no manual lever for movement along the optical axis or the like has to be used or even be provided. The user does not have to ensure that such slider is inserted to position the correct pupil position modulator into the beam path, no visual inspection is required and no manual moving of the modulator along the optical axis to subjectively homogenize the image impression over the field of view is necessary. In addition, no lateral manual moving of the modulator to generate an image expression to their subjective liking is required by the user. Additional to avoiding manual user interaction, embodiment of the invention enable quantitative assessment of the image data and successive quantitative analysis of contrast data.

Furthermore, in a multimodal microscope system also including fluorescence imaging, when switching imaging modalities from contrasting technique to fluorescence imaging, the user does not have to remove the slider manually. Rather, not only distortion of the fluorescence image point-spread function is automatically prevented, but also the attenuation of the modulator is removed, which would lead to less detected fluorescence photons and reduced signal to noise ratio in photon-starved situations such as fluorescence imaging.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

FIG. 1 illustrates, very schematically, a microscope 100 according to a preferred embodiment of the invention; in particular, FIG. 1 illustrates the beam paths of the microscope 100 and the relevant (optical) components, which are of particular interest. Note that such microscope 100 typically also includes a housing, a microscope stage and the like, which are not shown for sake of clarity.

The microscope 100 comprises an objective lens 106, which is arranged on an objective lens changer 114 (also called nosepiece or turret); via the objective lens changer 114. The objective lens 106 is placed onto an optical axis 120 of the microscope 100 and has an exit pupil 108. Further objective lenses (not shown) might be provided on or at the objective lens changer 114 and the objective lens changer 114 can then be configured to place any one out of the number of objective lenses onto the optical axis 120 (indicated with a double-sided arrow).

In addition, a focus drive 115 is provided that is configured to move the respective objective lens 106 placed onto the optical axis 120) in an axial direction, the z-direction, parallel to the optical axis 120. Note that the focus drive 115 can be integrated with the objective lens changer 114.

Further, the microscope 100 comprises a lens system 102, by means of example represented by two lenses (relay system) for forming a real intermediate image 104 of the exit pupil 108 of the (or any) objective lens 106, which is currently placed onto the optical axis 120. Said intermediate image 104 is formed at a respective conjugated plane 124, conjugate to the exit pupil 108.

Further, the microscope 100 comprises an illumination unit 122 for generating an illumination beam path 120.3 for illuminating the sample 128 to be imaged. The respective objective lens 106 placed onto the optical axis 120 generates an (orthoscopic) imaging beam path 120.2 for imaging the sample 128. An image of the sample 128 is detected by means of a digital image detecting module (detector) 112, which can be a camera or part of such camera. Note that also an eyepiece might be used (e.g., in addition), if required.

The illumination unit 122 comprises a fixed condenser lens 117, having an aperture diaphragm. Further, the illumination unit 122 comprises a condenser lens aperture changer 126 for generating a respective collimated illumination beam path of a respective aperture. Said condenser lens aperture changer 126, in turn, comprises besides said condenser lens 117, a condenser aperture diaphragm changer 116 for changing the aperture diaphragm (in particular, its dimensions, indicated by means of a double-sided arrow).

Note that also a conoscopic imaging beam path 120.1 is shown. While the orthoscopic imaging beam path 120.2 represents the beam for the objective lens 106 imaging the sample 128 into infinity, the conoscopic beam path 120.1 represents the beam path imaging the exit pupil 108 into the intermediate image 104 as described above.

Further, the microscope 100 comprises a modulation element 110 that is placed onto the optical axis 120 at a positon of the respective conjugated plane 124 or within a pre-defined range around the conjugated plane 124, i.e., along the z-direction. The modulation element 110 can be moved in a direction parallel to the optical axis 120 (z-direction) and in a lateral direction in respect of the optical axis 120 (x-direction). The modulation element is arranged on a modulation element positioning device 130, which will be described in more detail with respect to FIG. 2.

Further, the microscope 100 comprises a control device 118, comprising, for example, a processor (it might be a PC or a control unit integrated into the microscope), that is configured for automatically positioning said modulation element 110 onto the optical axis 120 at the positon described above. In particular, said control device 118 can be (electrically) connected to said element positioning device 130 in order to (automatically) move and position said modulation element 110 according to the requirements.

In addition, said control device 118 is (electrically) connected to the focus drive 115, for receiving information on an axis position of the respective objective lens 106. This allows determining the required axial position for the modulation element 110. Further, said control device 118 is (electrically) connected to the condenser lens aperture changer 126 in order to illuminate the sample with a pre-determined spatial illumination spectrum. This might include controlling the condenser lens aperture changer 126 or its condenser aperture diaphragm changer 116 in order change the diameter of the aperture (via opening or closing the aperture diaphragm).

Figure 2:
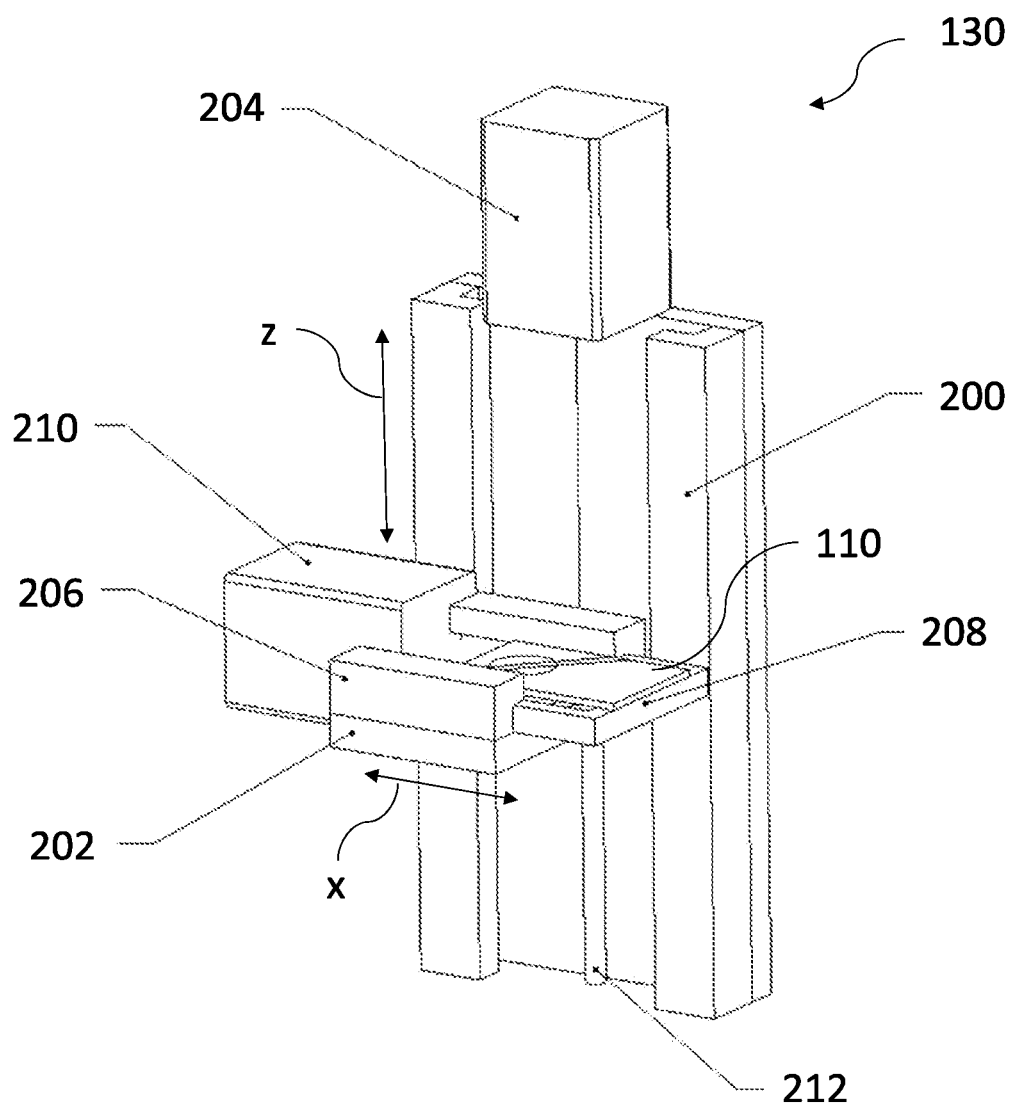
FIG. 2 schematically shows a modulation element positioning device of a microscope according to an embodiment of the invention.

FIG. 2 illustrates a modulation element positioning device 130 of a microscope according to a preferred embodiment of the invention in more detail than FIG. 1 does. Said modulation element positioning device 130 comprises a z-rail 200 and a z-slider 202. Said z-slider 202 is arranged on that z-rail 200 such that it can be moved in z-direction. A motor 204 and a drive shaft 212 are provided in order to move the z-slide and position it in very accurate manner in z-direction.

Said z-slider 202, in turn, comprises an x-rail 206 and an x-slider 208. Said x-slider 208 is arranged on that x-rail 206 such that it can be moved in z-direction. A motor 210 and a drive shaft (not shown) are provided in order to move the x-slide and position it in very accurate manner in x-direction. The modulation element 110 is placed on the x-slide 208 (this might be with tilt, as mentioned above). Both motors 204 and 210 can be connected to and be controlled by said control device 118. Said z-rail 200 can be arranged in or at the microscope 100 in a fixed manner.

The modulation element positioning device 130 is to be arranged with respect to the optical axis 120 of the microscope 100 such that the z-direction of the modulation element positioning device 130 coincides with or is parallel to the optical axis 120 (z-direction shown in FIG. 1). Accordingly, the modulation element 110 is movable in z-direction, i.e., in parallel to the optical axis 120 and in x-direction, i.e., in a lateral direction with respect to the optical axis 120. Note that the modulation element 110 has, in particular, the form of a plate or is, e.g., embedded in an anti-reflection coated plane-parallel plate. Such plate is then arranged orthogonal to the optical axis 120 or with slight tilt in order to reduce reflections.

Figure 3B:
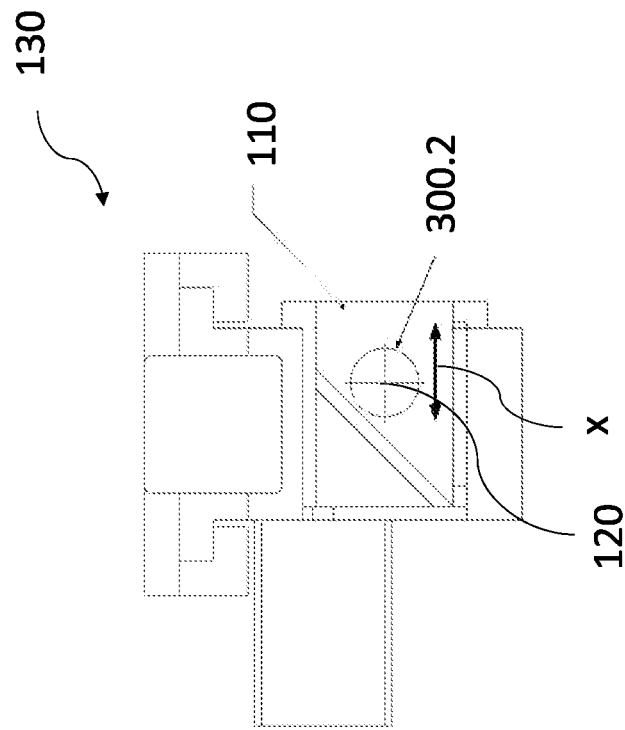
FIGS. 3a and 3b schematically show different views of the modulation element positioning device of FIG. 2.
Figure 3A:
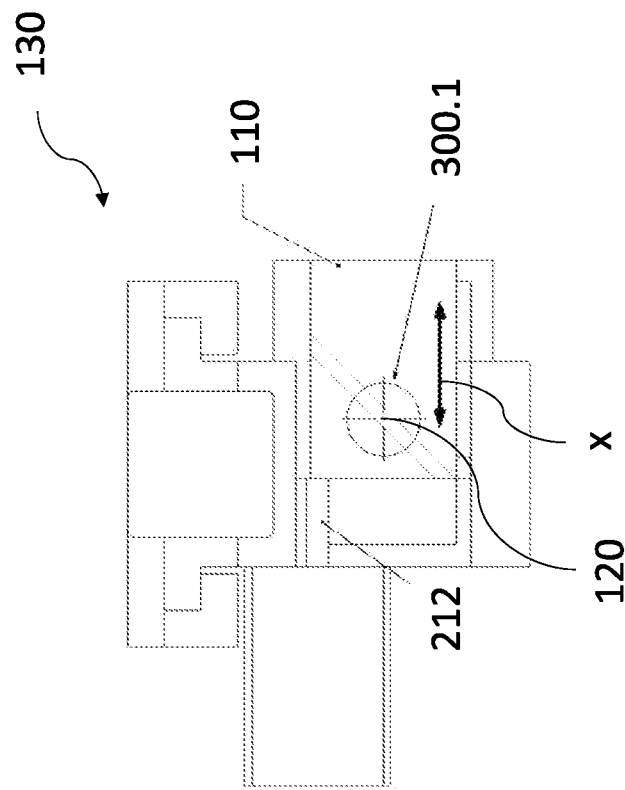

FIGS. 3*a* and 3*b* illustrate different views of the modulation element positioning device 130 of FIG. 2, viewed along the optical axis 120, onto the top side as shown in FIG. 2. In particular, FIG. 3*a* illustrates a situation, in which the modulation element 110 is positioned onto the optical axis 120. This is visualized by means of the image 300.1 of the exit pupil 108. As can be seen, parts of the non-transparent or partly transparent sections or areas of the modulation element 110 (indicated by means of two parallel lines, see FIG. 4*a* for a more detailed view) are placed within the image 300.1.

FIG. 3*b*, in particular, illustrates a situation, in which the modulation element 110 is positioned out of the optical axis 120. As can be seen, all non-transparent and partly transparent sections or areas of the modulation element 110 (indicated by means of two parallel lines) are placed outside of the image, the image denoted 300.2 In order to move the modulation element 110 (or its non-transparent areas) out of the imaging beam path (image 300.1 in FIG. 3*a*), the x-slider is to be moved in (lateral) x-direction. Note that the modulation element 110 comprises a (fully) transparent section arranged such that upon a pre-determined lateral displacement of the modulation element 110 out of its position on the optical axis 120, the imaging beam path passes the transparent section of the modulation element 110.

FIGS. 4*a* and 4*b* schematically illustrate different kind of modulation elements of a microscope according to different preferred embodiment of the invention. These modulation elements are for use in modulation contrast methods. FIG. 4*a*, in particular, illustrates the modulation element 110, basically shown in FIGS. 3*a*, 3*b*, in more detail. The modulation element 110 has the form of a plate with rectangular shape and comprises a non-transparent section or area 400 (absorption coefficient of, e.g., 100% or transparency of 0%), a partly transparent section or area 402 (absorption coefficient of, e.g., 80% or transparency of 20%), and a (fully) transparent section or area 404 (absorption coefficient of, e.g., 0% or transparency of 100%).

Image 300.1 shows the image of the exit pupil when the modulation element 110 is placed onto the optical axis, and image 300.2 shows the image of the exit pupil when the modulation element 110 is placed outside the optical axis. In the latter case, the full imaging beam path passes (only) the full transparent section 404. This means that the modulation element 110 (or its effect) is inactivated. In order to achieve this, the modulation element 110 is moved laterally (vertical direction in FIG. 4*a*, x-direction in FIGS. 3*a*, 3*b*) by a pre-determined lateral displacement, out of the optical axis. In the shown example of FIG. 4*a*, such pre-determined lateral displacement corresponds to the distance between the centers of the two images 300.1 and 300.2, denoted with reference numeral d.

FIG. 4b shows the modulation element 110 and, in addition, a second or further modulation element 410. By means of example, both modulation elements 110 and 410 are provided as a single or combined modulation element 412, providing the modulation effect of modulation element 110 with areas or sections 400, 402 and 404. In addition, it provides another modulation effect by means of partly transparent section or area 406 (absorption coefficient of, e.g., 80% or transparency of 20%), and non-transparent section or area 408 (absorption coefficient of, e.g., 100% or transparency of 0%).

While the absorption coefficients might be the same as for modulation element 110, these areas or sections 406, 408 are rotated by 90° with respect to the respective sections or areas 400, 402 and, they are arranged in inverted order. In this way, the modulation contrast, effected by modulation element 410, is rotated by 90° with respect to the modulation element 110.

In order to place modulation element 410 onto the optical axis, combined modulation element 412 hat to be moved further in lateral direction (the vertical direction in FIG. 4b) such that the image 300.3 of the exit pupil is achieved. The modulation element positioning device then should be able to achieve the required lateral displacement. Note that these two modulation element 110 and 410 could also be provided as two separate elements or plates. A difference in the two modulation elements can include, for example, the strength of the contrast with a suitable aperture.

Figure 5B:
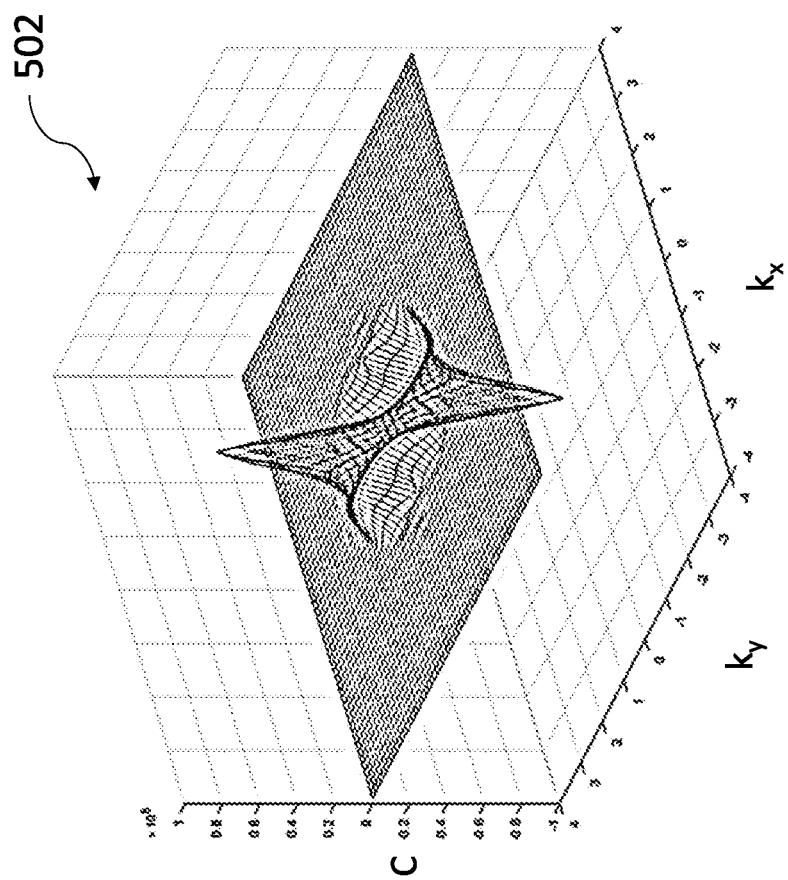
FIGS. 5a and 5b show amplitude and phase transfer functions for modulation contrast microscopy.
Figure 5A:
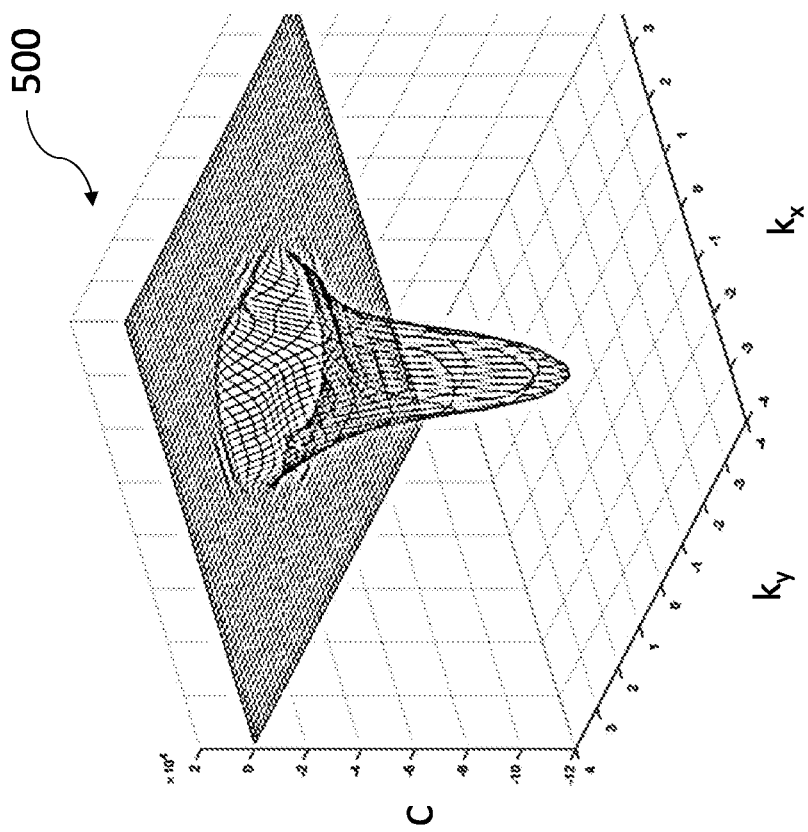

FIGS. 5a and 5b illustrate an amplitude transfer function 500 (FIG. 5a) and a phase transfer function 502 (FIG. 5b) for modulation contrast microscopy and imaging. In each case, the contrast C (in arbitrary units) is illustrated in the vertical direction vs. the lateral ($k_x$, $k_y$) directions (in $\mu m^{-1}$). These functions can be determined or calculated by means of the control device from the respective data of the entire system and the detected images and allows reconstructing a quantitative phase image of the imaged sample. A modulator arrangement such as the one depicted as 410 (or combined element 412) in FIG. 4b, can be used to improve the frequency space coverage of the phase transfer function for quantitative phase reconstruction.

Figure 6:
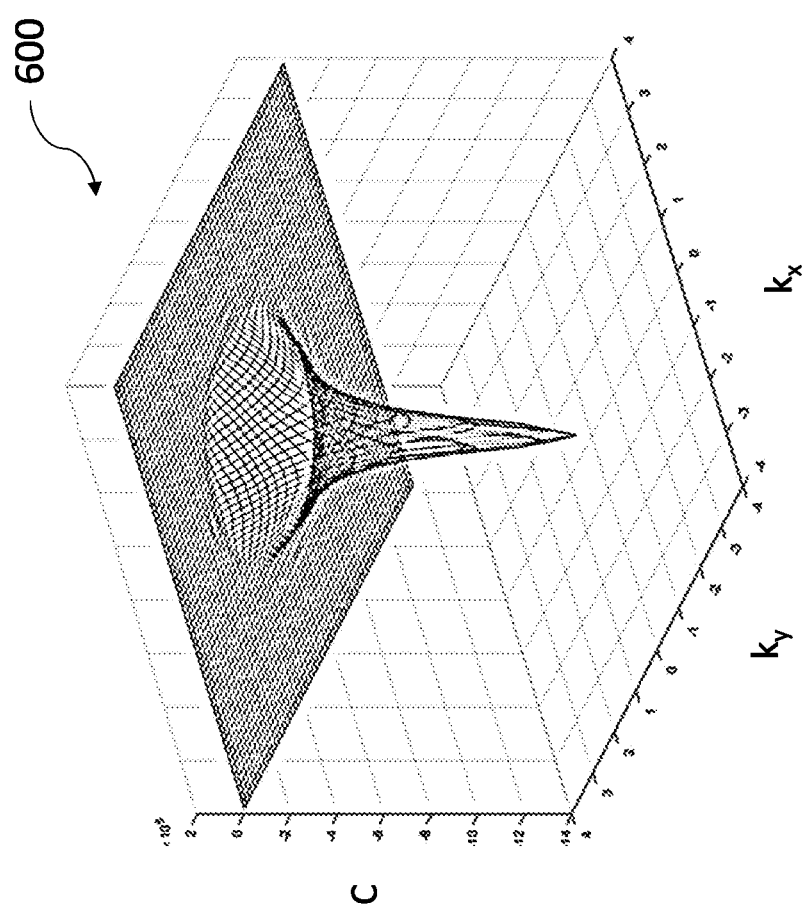
FIG. 6 shows an amplitude transfer function in bright field microscopy.

FIG. 6 illustrates an amplitude transfer function 600 in bright field microscopy. The contrast C (in arbitrary units) is illustrated in the vertical direction vs. the lateral ($k_x$, $k_y$) directions (in $\mu m^{-1}$). Similarly to the transfer functions for modulation contrast, this function can be determined or calculated by means of the control device from the respective data of the entire system and the detected images and allows reconstructing a quantitative phase image of the imaged sample.

The transfer functions in FIGS. 5a, 5b and 6 play the role of the transfer functions H which correlate the complex refractive index distribution of the object to the intensity images detected by the system (see remarks above, also with respect to "Michael Chen, Lei Tian, and Laura Waller, 3D differential phase contrast microscopy, Biomed. Opt. Express 7, 3940-3950 (2016)"). Since the forward image formation is usually formulated as a convolution operation, it is common to depict the Fourier amplitudes of the respective transfer functions such as in the respective figures.

It can easily be seen that the modulation contrast phase transfer function 502 (FIG. 5b) does translate a phase change ($k_y>0$ or $k_y<0$) of the object into a positive or negative intensity modulation, and the amplitude (absorptivity) of the object into a negative intensity modulation of the image, whereas the phase transfer function for transmitted light brightfield imaging is zero everywhere and has therefore been omitted. As described above, the coverage of the phase transfer function of the whole system can be improved by using a modulation element such as element 410. With the help of these transfer functions, the forward model of the complete imaging system can be formulated and eventually inverted as described above.

As can be seen in FIG. 5b, there is a line at $k_y=0$ at which the magnitude of the phase transfer function disappears, that is to say that phase structures in this direction do not generate any contrast in the image. This is unattractive for a reconstruction. With the help of the second position, the modulator 410 can rotate this line to $k_x=0$ (due the non and partly transparent areas rotated by 90°), so that in total all frequency components except for $k_x=k_y=0$ are covered. This allows generating a significantly better reconstruction.

Figure 7:
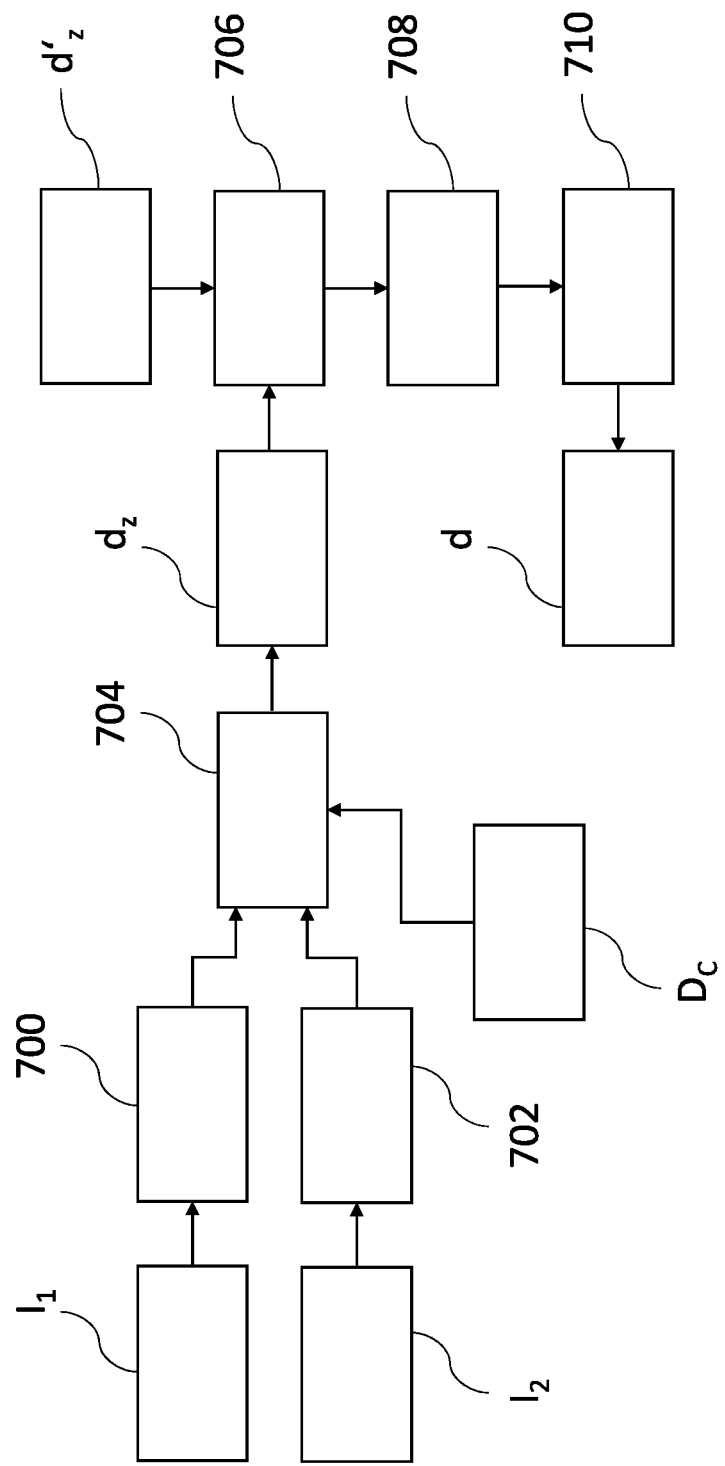
FIG. 7 illustrates steps performed by a control device of a microscope according to an embodiment of the invention.

FIG. 7 illustrates steps, which control device of a microscope according to a preferred embodiment of the invention performs, e.g., the control device 100 shown in FIG. 1, in order to position or move the modulation element.

In a step 700, the control device receives information $I_1$ from the objective lens changer about which objective lens is currently placed onto the optical axis. In a step 702, the control device receives information $I_2$ from the focus drive about the axial position of the objective lens currently placed onto the optical axis. In a step 704, the control device determines, based on the received information and further data Dc like data of the optical components of the microscope, calibration data and the like, an axial displacement $d_z$ of the respective conjugate plane.

In a step 706, the control device checks, whether the determined axial $d_z$ is above a pre-determined threshold $d'_z$ and, if so, moves the modulation element in z-direction by that axial displacement $d_z$ in a step 708. This includes, in particular, controlling the modulation element positioning device and its motor.

In a further step 710, the control device can move the modulation element out of the optical axis by moving it by pre-determined lateral displacement d (as explained above), if inactivation of the modulation element is required.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a control device as described in connection with one or more of the FIGS. 1 to 7. Alternatively, a microscope may be part of or connected to a system as described in connection with one or more of the FIGS. 1 to 7. FIG. 1 shows a schematic illustration of a microscope 100 with control device (system) 118 configured to perform a method described herein. The microscope 100 comprises a control device (computer system) 118. The microscope 100 is configured to take images and is connected to the computer system 118. The computer system 118 is configured to execute at least a part of a method described herein. The computer system 118 may be configured to execute a machine learning algorithm. The computer system 118 and microscope 100 may be separate entities but can also be integrated together in one common housing. The computer system 118 may be part of a central processing system of the microscope 100 and/or the computer system 118 may be part of a subcomponent of the microscope 100, such as a sensor, an actor, a camera or an illumination unit, etc. of the microscope 100.

The computer system 118 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 118 may comprise any circuit or combination of circuits. In one embodiment, the computer system 118 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 118 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 118 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 118 may also include a display device, one or more speakers, and a keyboard and/or controller, which can include a mouse, trackball, touch screen, voice-recognition device, or any other device that permits a system user to input information into and receive information from the computer system 118.

Some or all of the method steps may be executed by (or using) a hardware apparatus, like for example, a processor, a microprocessor, a programmable computer or an electronic circuit. In some embodiments, some one or more of the method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

| | |
|---|---|
| 100 | microscope |
| 102 | lens system |
| 104 | intermediate image |
| 106 | objective lens |
| 108 | exit pupil |
| 110 | modulation element |
| 112 | digital image detection module |
| 114 | objective lens changer |
| 115 | focus drive |
| 116 | condenser aperture diaphragm changer |
| 117 | condenser lens |
| 118 | control device |
| 120 | optical axis |
| 120.1 | conoscopic imaging path |
| 120.2 | orthoscopic imaging path |
| 120.3 | illumination beam path |
| 122 | illumination unit |
| 124 | conjugated plane |
| 126 | condenser lens aperture changer |
| 128 | sample |
| 130 | modulation element positioning device |
| 200 | z-rail |
| 202 | z-slider |
| 204, 210 | motor |
| 206 | x-rail |
| 208 | x-slider |
| 212 | drive shaft |
| 300.1, 300.2, 300.3 | images of the exit pupil |
| 400, 408 | non-transparent sections |
| 402, 406 | partly transparent sections |
| 404 | transparent section |
| 500, 502, 600 | transfer functions |
| d | pre-determined lateral displacement |
| $d_z$ | axial position displacement |
| $d'_z$ | pre-determined axial position displacement threshold |
| C | contrast |
| $D_C$ | data |
| $I_1, I_2$ | information |
| x, y, z, $k_x$, $k_y$ | directions |
| 700-708 | steps |

The invention claimed is:

1. A microscope for imaging a sample by a transmitted light contrasting method, the microscope comprising:
an objective lens holder or changer configured to place an objective lens of a number of objective lenses onto an optical axis of the microscope,
a lens system for forming an intermediate image of an exit pupil of any one of the number of objective lenses placed onto the optical axis, the intermediate image being formed at a respective conjugated plane conjugate to the exit pupil, and
a control device configured for automatically positioning a single modulation element for different objective lenses of the number of objective lenses onto the optical axis at a position related to the respective conjugated plane, and for automatically moving the modulation element in an axial direction parallel to the optical axis.

2. The microscope according to claim 1, wherein the control device is connected to the objective lens holder or changer for receiving information on the respective objective lens placed onto the optical axis.

3. The microscope according to claim 1, wherein the control device is connected to a focus drive of the microscope, the focus drive being configured to move the respective objective lens placed onto the optical axis in the axial direction parallel to the optical axis, the control device is configured to receive information of an axis position of the respective objective lens.

4. The microscope according to claim 1, wherein the control device is configured to axially move the modulation element only if an axial position displacement of the respective conjugated plane exceeds a pre-determined threshold.

5. The microscope according to claim 1, wherein the control device is configured for automatically moving the modulation element in a lateral direction with respect to the optical axis.

6. The microscope according to claim 5, wherein the control device is configured to determine a lateral displacement of the modulation element according to a quantitative image quality analysis.

7. The microscope according to claim 6, wherein the quantitative image quality analysis comprises at least one of a quantitative reproducibility of an image impression or a quantitative reproducibility of a contrast transfer function.

8. The microscope according to claim 1, wherein the control device is configured to exchange the modulation element by a second modulation element by a lateral movement of the modulation element out of the optical axis and by a lateral movement of the second modulation element onto the optical axis.

9. The microscope according to claim 8, wherein the control device is further configured to adapt an illumination of the microscope according to the second modulation element.

10. The microscope according to claim 1, wherein the microscope comprises an illumination unit for generating an illumination beam path for illuminating the sample to be imaged, and wherein the respective objective lens placed onto the optical axis generates an imaging beam path for imaging the sample.

11. The microscope according to claim 10, wherein the modulation element comprises a transparent section arranged such that upon a pre-determined lateral displacement of the modulation element out of its position on the optical axis, the imaging beam path passes the transparent section of the modulation element.

12. The microscope according to claim 11, wherein the control unit is configured to laterally move the modulation element by the pre-determined lateral displacement in order to inactivate the modulation element.

13. The microscope according to claim 1, wherein the modulation element is embedded in an anti-reflection coated plane-parallel plate.

14. The microscope according to claim 1, wherein the modulation element is tilted relative to the optical axis.

15. The microscope according to claim 10, wherein the illumination unit comprises a condenser lens aperture changer for generating a respective collimated illumination beam path of a respective aperture, the control device being connected to the condenser lens aperture changer in order to illuminate the sample with a pre-determined spatial illumination spectrum.

16. The microscope according to claim 15, wherein the condenser lens aperture changer comprises a condenser lens and a condenser aperture diaphragm changer.

17. The microscope according to claim 1, wherein the microscope further comprises a digital image detection module for detecting an image of the sample to be imaged.

18. The microscope according to claim 17, wherein the control device is connected to the digital image detection module in order to detect intensity images for at least one of: displaying, documentation, quantitative reconstruction of specimen phase modulation, or quantitative reconstruction of specimen amplitude modulation.

19. The microscope according to claim 1, wherein the control device is configured to determine at least one of a phase transfer function or an amplitude transfer function of the optical system of the microscope in order to reconstruct a quantitative phase image of the sample.

20. The microscope according to claim 1, further comprising a modulation element positioning device comprising at least one slider configured to carry the modulation element, the at least one slider configured to move in at least the axial direction parallel to the optical axis.

21. The microscope according to claim 1, wherein the control device is configured for automatically positioning the single modulation element for different classes of objective lenses with different positions of the exit pupil along the optical axis.

* * * * *